(12) United States Patent
Lange

(10) Patent No.: US 9,115,818 B2
(45) Date of Patent: Aug. 25, 2015

(54) SINGLE-LEVER MIXING CARTRIDGE

(71) Applicant: Fluehs Drehtechnik GmbH, Luedenscheid (DE)

(72) Inventor: Lutz Lange, Luedenscheid (DE)

(73) Assignee: Fluehs Drehtechnik GmbH, Luedenscheid (DE)

( * ) Notice: Subject to any disclaimer, the term of this patent is extended or adjusted under 35 U.S.C. 154(b) by 0 days.

(21) Appl. No.: 14/366,372

(22) PCT Filed: Feb. 4, 2013

(86) PCT No.: PCT/EP2013/052159
§ 371 (c)(1),
(2) Date: Jun. 18, 2014

(87) PCT Pub. No.: WO2013/127602
PCT Pub. Date: Sep. 6, 2013

(65) Prior Publication Data
US 2014/0326342 A1    Nov. 6, 2014

(30) Foreign Application Priority Data
Feb. 28, 2012 (DE) .................... 20 2012 100 685 U

(51) Int. Cl.
*F16K 27/00* (2006.01)
*F16K 11/078* (2006.01)
*F16K 27/04* (2006.01)

(52) U.S. Cl.
CPC ......... *F16K 11/0782* (2013.01); *F16K 11/0787* (2013.01); *F16K 27/045* (2013.01); *Y10T 137/86509* (2015.04)

(58) Field of Classification Search
CPC ..... F16K 27/044; F16K 27/045; F16K 27/00; F16K 11/0787
USPC ........ 137/625.17, 636.1, 636.2, 636.3, 636.4, 137/891; 4/675, 676
See application file for complete search history.

(56) References Cited

U.S. PATENT DOCUMENTS

| 4,387,880 A * | 6/1983 | Saarisalo et al. ............... 251/285 |
| 4,633,906 A * | 1/1987 | Tuchman .................. 137/625.17 |
| 4,733,688 A * | 3/1988 | Lorch ......................... 137/454.6 |
| 4,887,642 A * | 12/1989 | Bernat ..................... 137/625.41 |
| 5,095,934 A * | 3/1992 | Iqbal ............................. 137/270 |
| 5,375,624 A | 12/1994 | Knapp |
| 6,920,899 B2 * | 7/2005 | Haenlein et al. ........... 137/636.3 |
| 7,032,272 B2 * | 4/2006 | Haenlein ......................... 16/366 |
| 2011/0017327 A1 * | 1/2011 | Christ .......................... 137/602 |

FOREIGN PATENT DOCUMENTS

DE    39 91 752 C2    7/1997
WO    91/05191 A1    4/1991

OTHER PUBLICATIONS

International Search Report of PCT/EP2013/052159, mailed Jun. 26, 2013.

* cited by examiner

Primary Examiner — John K Fristoe, Jr.
Assistant Examiner — Kevin Barss
(74) Attorney, Agent, or Firm — Collard & Roe, P.C.

(57) ABSTRACT

The invention relates to a single-lever mixing cartridge, comprising a head piece (1), which accommodates a bottom piece (8), and a disk control having a control disk (5) that can be displaced via an at least pivotably mounted spindle (2). An outer thread for screwing into a fitting is provided, and a fastening ring (16) is provided which has the external thread (161) and which is placed on the head piece (1) and is captively held thereon.

16 Claims, 15 Drawing Sheets

Figure 1:
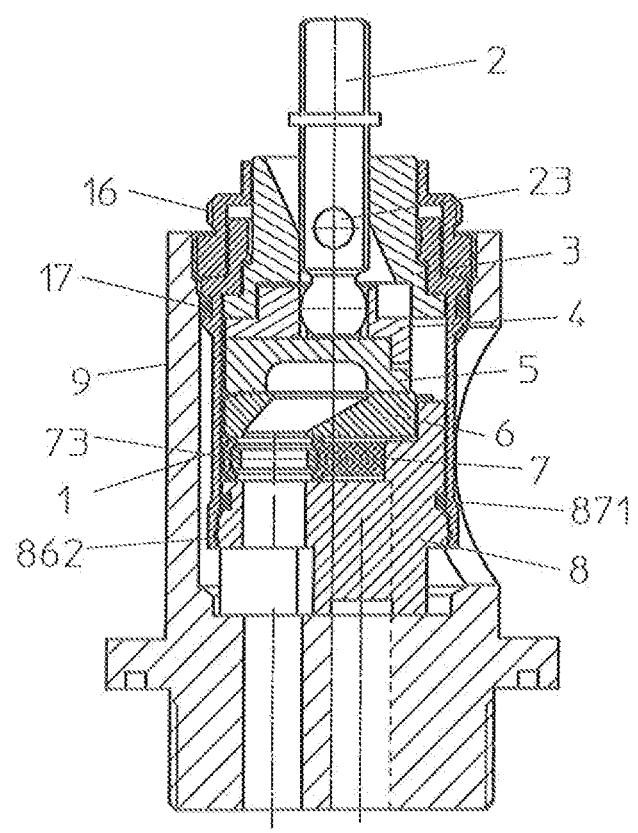

Fig. 7
a) 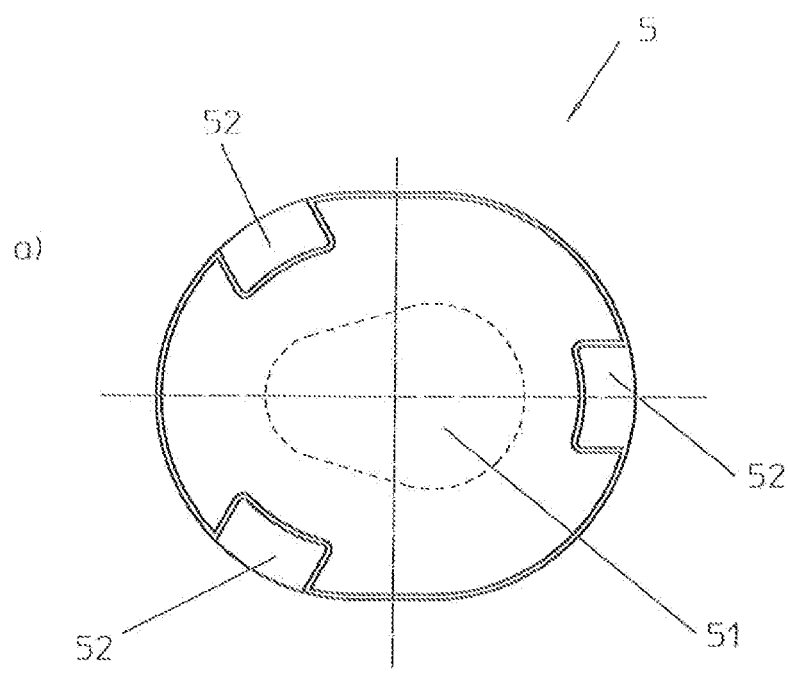
b) 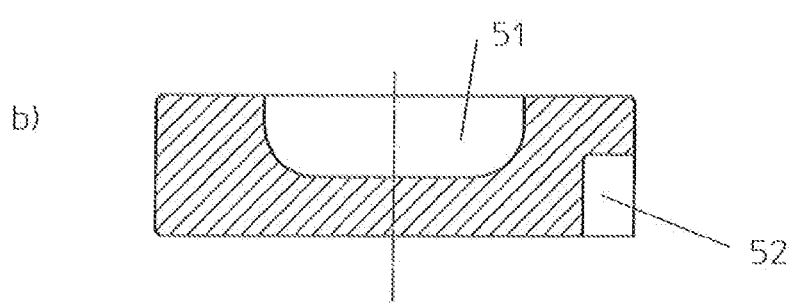
c) 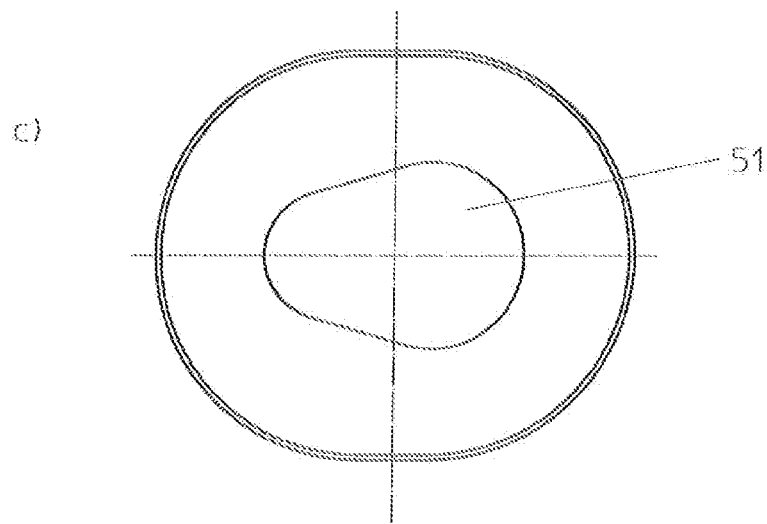

Fig. 8
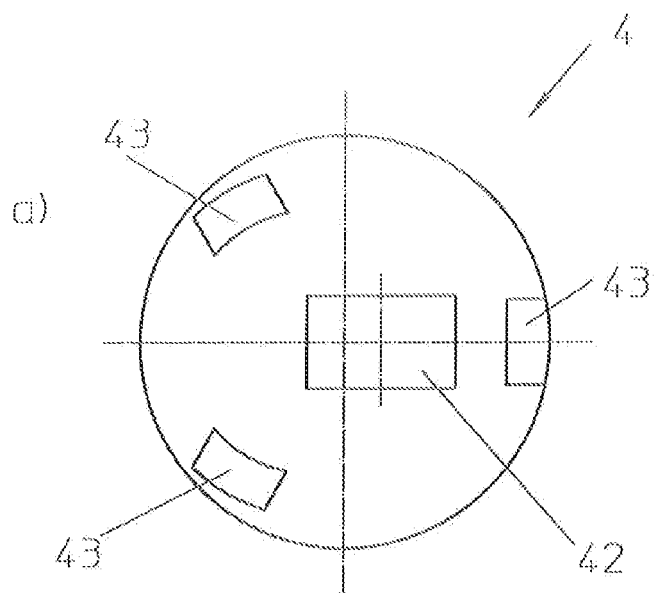
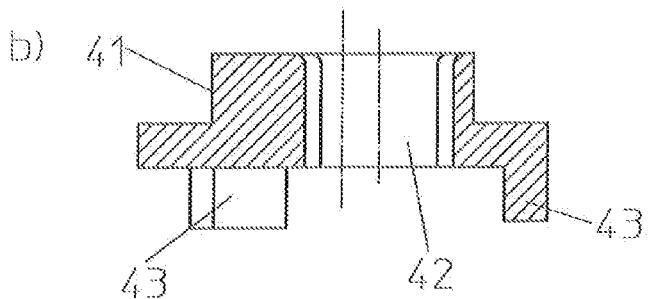
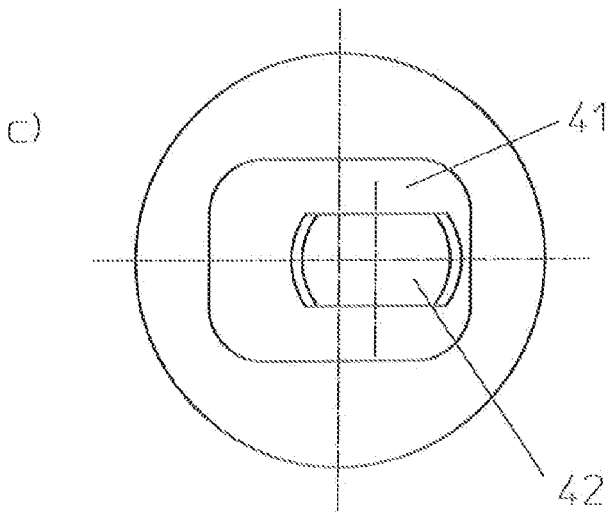

SINGLE-LEVER MIXING CARTRIDGE

CROSS REFERENCE TO RELATED APPLICATIONS

This application is the National Stage of PCT/EP2013/052159 filed on Feb. 4, 2013, which claims priority under 35 U.S.C. §119 of German Application No. 20 2012 100 685.5 filed on Feb. 28, 2012, the disclosures of which are incorporated by reference. The international application under PCT article 21(2) was not published in English.

The invention relates to a single-lever mixer cartridge comprising a head piece that accommodates a bottom piece, as well as a disk controller having a control disk that is disposed so as to be displaced by way of at least one spindle mounted so as to pivot.

Mixer cartridges are frequently used in sanitary fittings, in which a control disk as well as a disk controller having a pass-through disk are disposed, which cartridge can be operated by way of a single lever, in such a manner that not only the amount of water but also the water temperature can be controlled by way of one and the same lever. Such interchangeable cartridges can be used in fitting housings having different structures. In some application areas, modified cartridges are also used, in which a constant mixing ratio is set, whereby the rotational movement of the lever is blocked, so that only an adjustment of the amount of water can take place by way of the pivoting movement of the lever. This embodiment is also used in those application areas in which only one inflow channel is present in the fitting.

In the configuration of fitting housings, there is increasingly a desire for the smallest possible structure. For this reason, it is necessary to construct the mixer cartridges in small and compact manner, whereby simultaneously, the demand for a large amount of water exists. Mixer cartridges are regularly composed of plastic injection-molded parts, whereby because of the small dimensioning of the components, connected with generously dimensioned passage openings to allow water to pass through, only small material thicknesses are present in some regions.

Mixer cartridges of the aforementioned type are used in sanitary fittings and are sealed, at least relative to the water inflow disposed within the fitting, by means of a seal on the bottom side. For this purpose, the cartridge is biased against the fitting by way of a nut. Depending on the configuration of the fitting, different nuts can be used, which must be assigned to the corresponding cartridge. Here, increased work effort can occur due to incorrect assignment.

This is where the invention wants to provide a remedy. The invention is based on the task of creating a single-lever mixer cartridge in which efforts due to absent or incorrectly assigned clamping nuts are avoided. According to the invention, this task is accomplished by means of the characteristics of the characterizing part of claim 1.

With the invention, a single-lever mixer cartridge is created, in which efforts due to absent or incorrectly assigned clamping nuts are avoided. By means of the placement of a fastening ring having an outside thread, which is set onto the head piece and captively held on it, separate assignment of a clamping nut during the course of assembly of the mixer cartridge is eliminated. Preferably, a circumferential engagement projection is formed onto the fastening ring on its end facing the head piece, at least in certain regions, which projection engages into an engagement groove introduced into the head piece circumferentially on the outside.

In an embodiment of the invention, a holding projection directed radially outward is formed on the head piece on its end facing the fastening ring, at least in certain sections, the outside diameter of which projection is essentially equal to the inside diameter of the fastening ring. In this way, simple assembly of the fastening ring, which is subsequently captively held on the cartridge, is made possible. For this purpose, the fastening ring is pushed over the outwardly directed holding projection of the head piece, which is temporarily elastically deformed slightly, with force, with its circumferential engagement projection. After the engagement projection has been overcome, the latter deforms back to its original shape, and thereby the fastening ring is captively held on the head piece.

In a further development of the invention, the spindle is is held in a spindle accommodation so as to pivot, which accommodation is held in the head piece so as to rotate. In this connection, preferably at least one pin that projects radially outward is disposed on the spindle accommodation, which pin is guided in a guide of the head piece. In this way, a stop for the spindle is formed for both directions of rotation.

It is advantageous if a radial passage bore is introduced into the spindle accommodation, through which bore a pin is guided, which projects radially beyond the spindle accommodation on two opposite sides and forms the pivot axis for the spindle, which has a passage bore through which the pin is guided. In this way, simple assembly of the spindle is made possible.

In a further embodiment of the invention, the guide is formed by means of at least one recess into which the pin engages and the side walls of which form a stop limitation for the pin. In this way, a reliable stop that can be produced in simple manner is achieved.

In a further embodiment of the invention, the recess is configured to be open toward the top, and closed by means of the fastening ring applied to the head piece. In this way, assembly of the mixer cartridge is further simplified. The individual components can thereby be introduced into the head piece from above, one after the other, whereby the pin of the spindle lies in the recess of the head piece. By means of the subsequent assembly of the fastening ring, the recess, with the pin situated in it, is closed. Recess and fastening ring now form the guide and the stop for the pin that serves as a pivot axis of the spindle.

In a further development of the invention, the spindle accommodation has a recess for a slide piece on its side facing the bottom piece, into which recess the spindle projects. In this connection, an opening is preferably introduced into the slide piece, into which opening the spindle engages on the end side, by way of which spindle the slide piece is displaceable on the spindle accommodation on its side facing the control disk. In this way, a reliable disk controller that can be assembled in simple manner is made possible.

It is advantageous if at least one ridge that projects axially out of its surface facing away from the spindle accommodation is formed onto the slide piece, which ridge engages into a recess of the control disk. In this way, the control disk is connected with the slide piece with shape fit.

In an embodiment of the invention, an accommodation for torque-proof placement of a pass-through disk is introduced into the bottom piece, on its side facing the control disk. In this connection, the accommodation is preferably formed by ridges that run circumferentially and engage into recesses disposed laterally in the pass-through disk. The ribs particularly preferably describe an arc, the diameter of which is approximately equal to the inside diameter of the head part, whereby a projection is formed onto the ridges, which projection engages into a corresponding recess of the pass-through disk.

Preferably, the head piece is produced from metal, preferably from brass. In this way, a change in shape of the head piece due to the bias force applied by means of the fastening ring is prevented.

Figure 2:
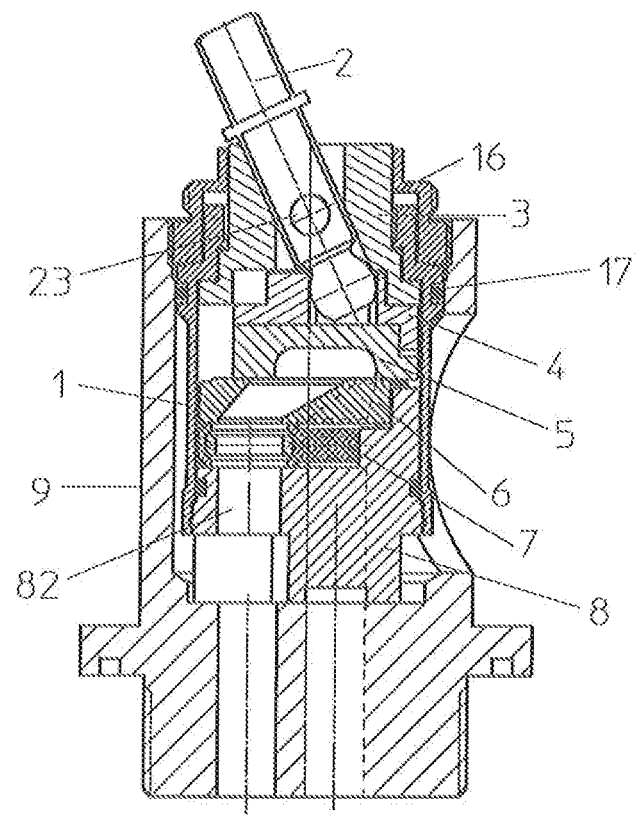
Figure 3:
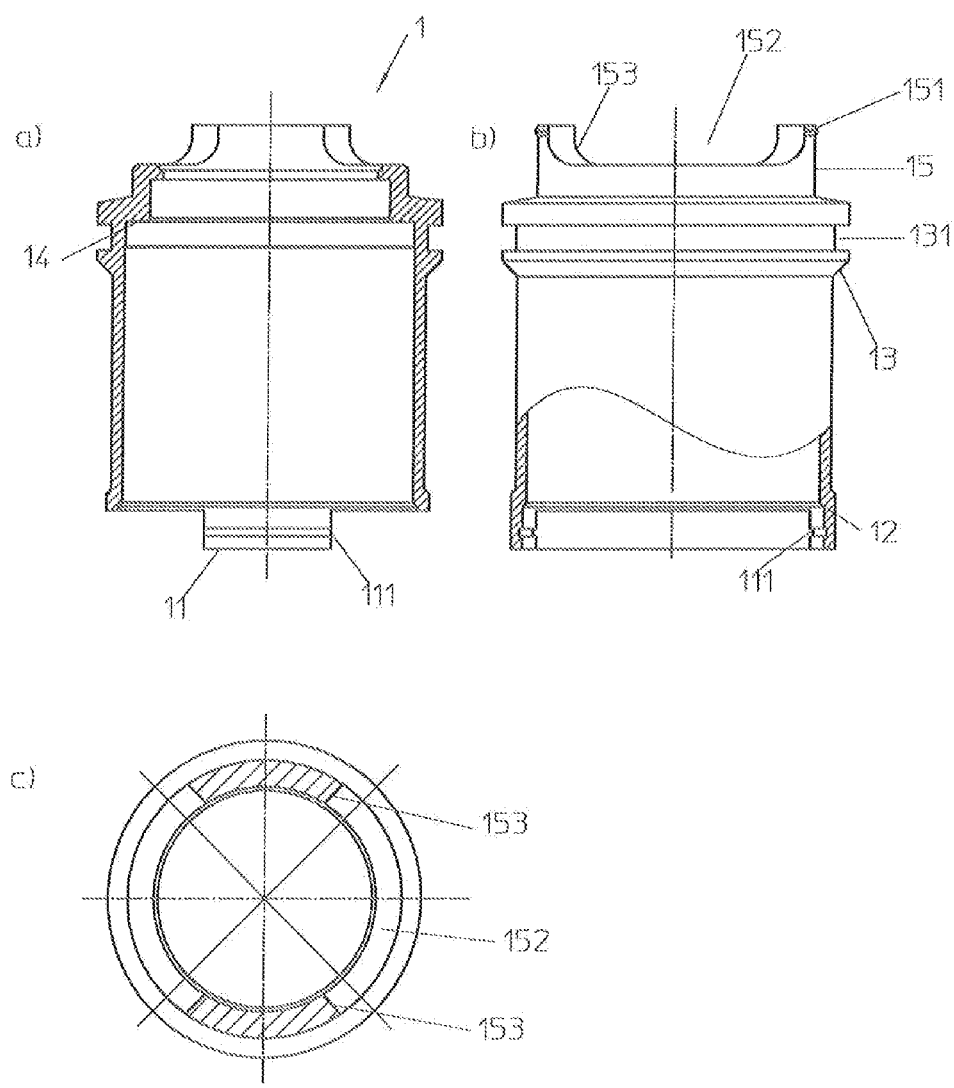
Figure 4:
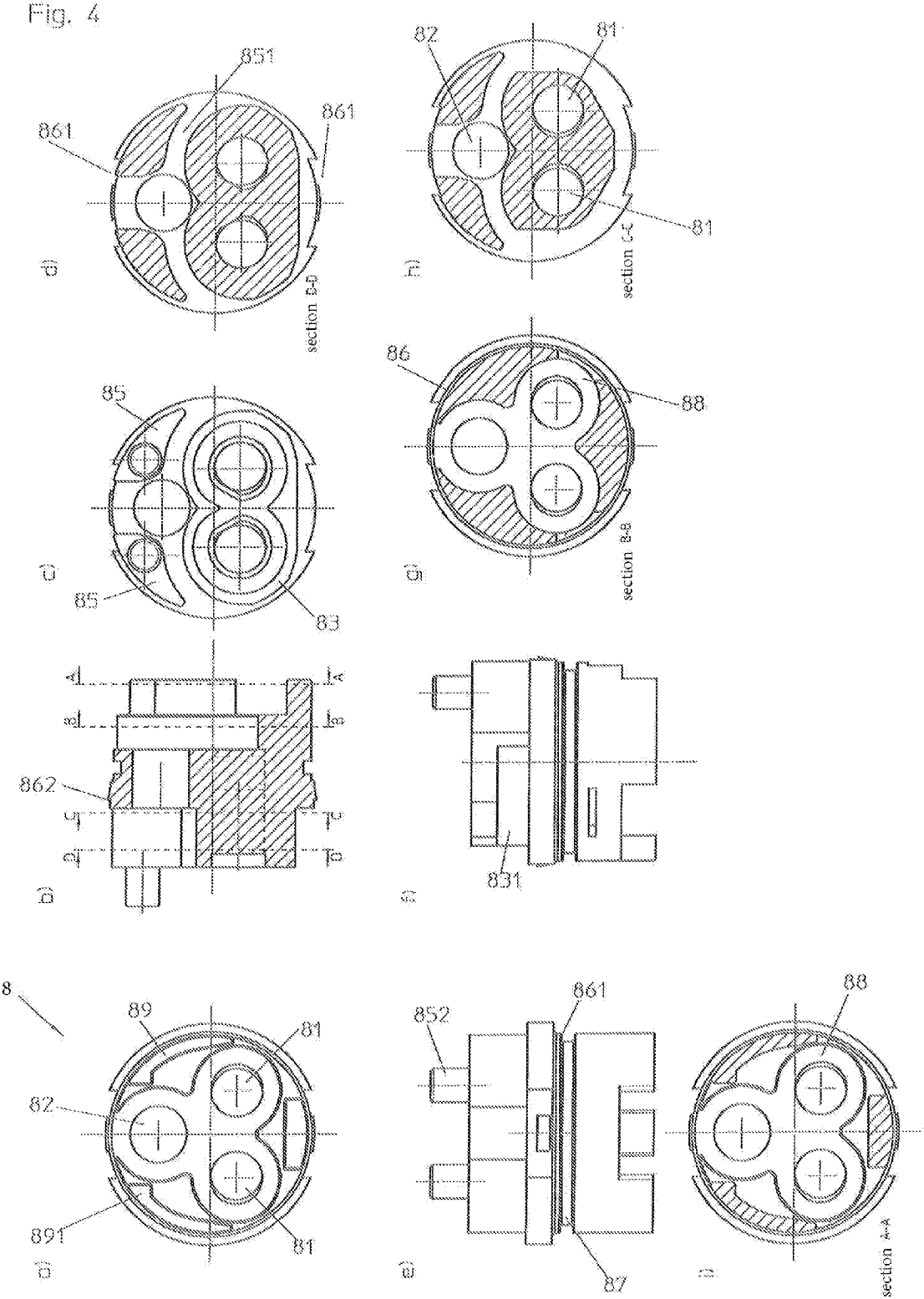
Figure 5:
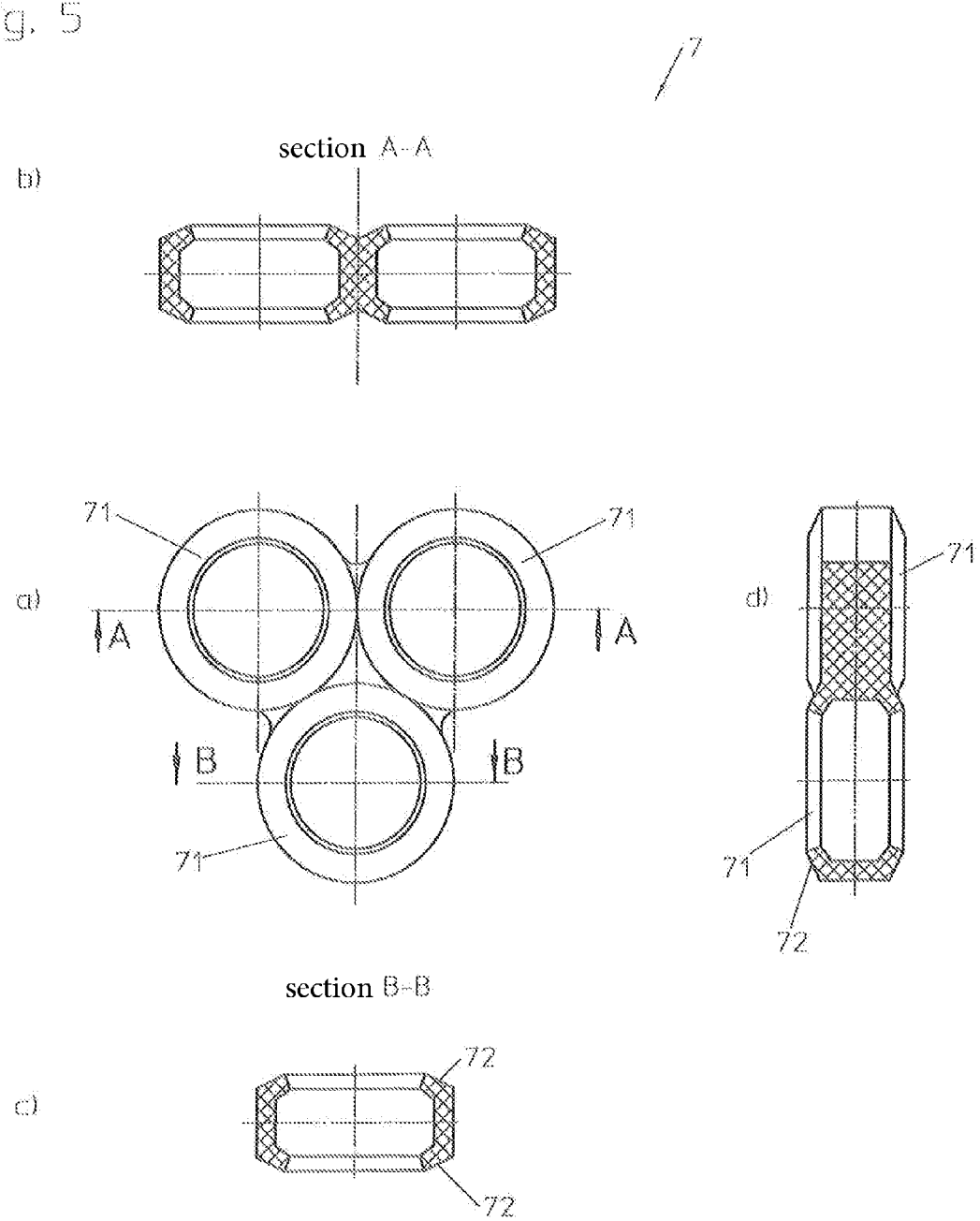
Figure 6:
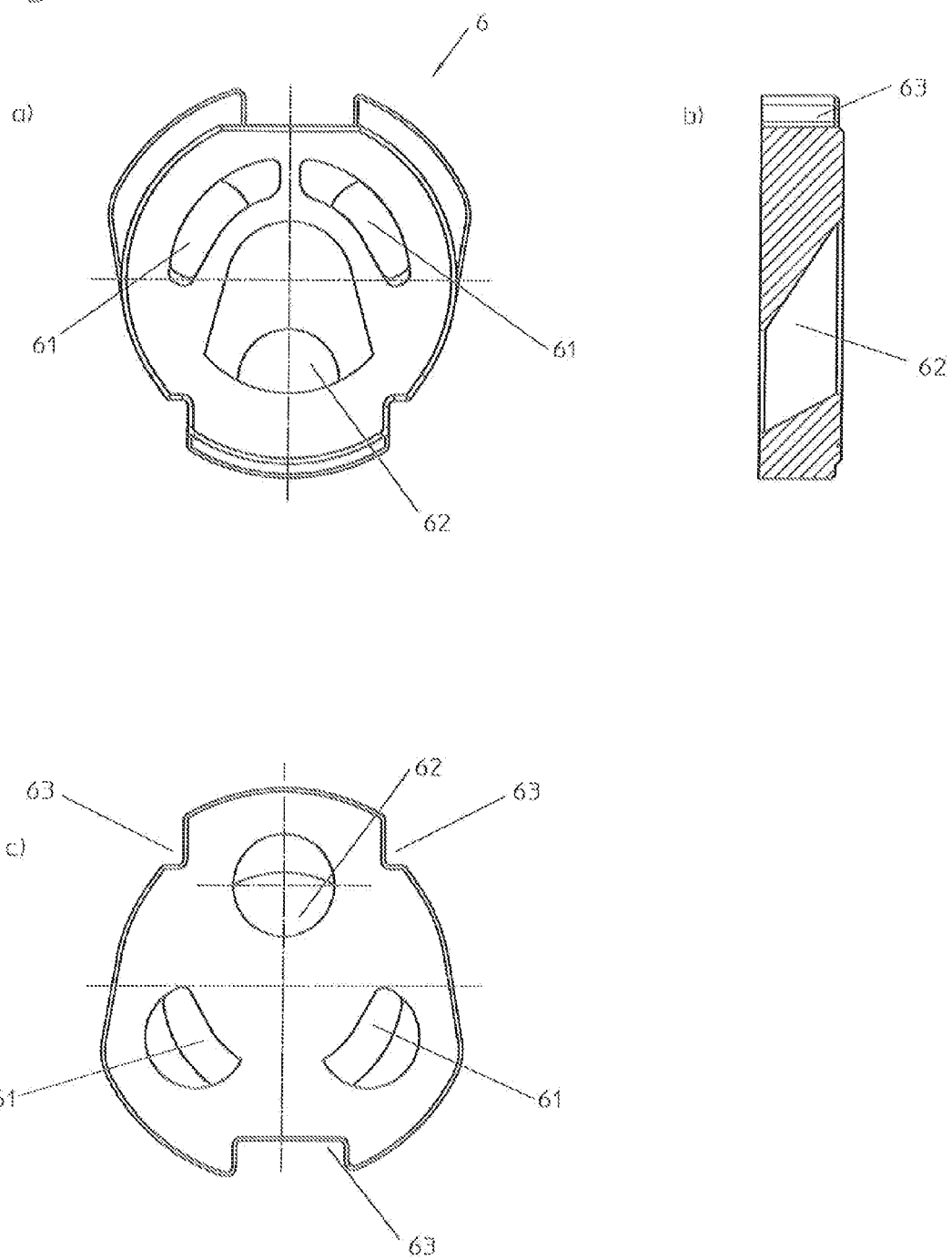
Figure 9:
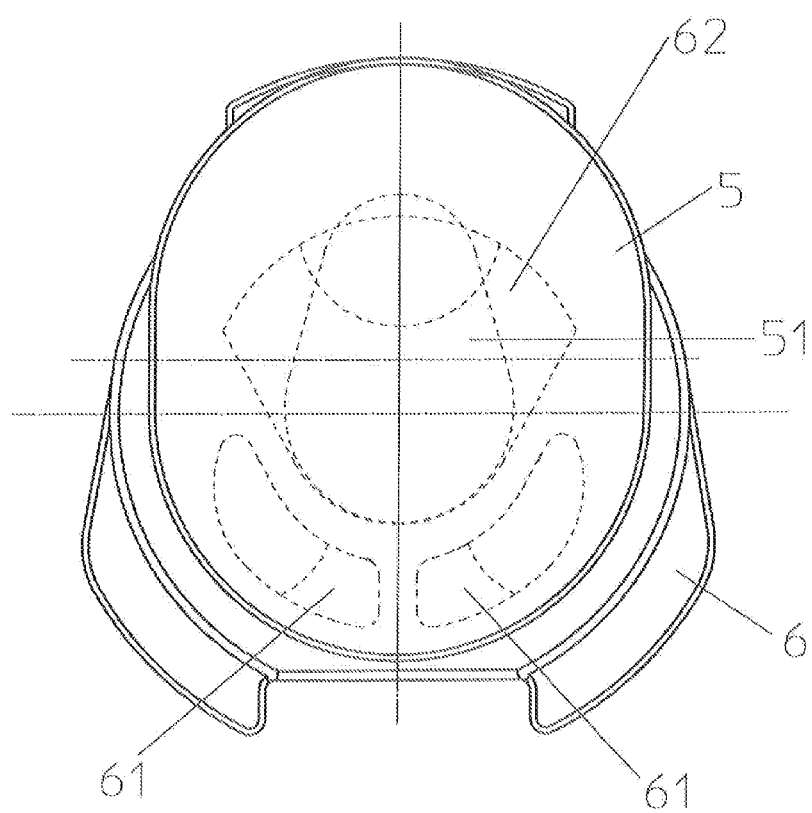
Figure 10:
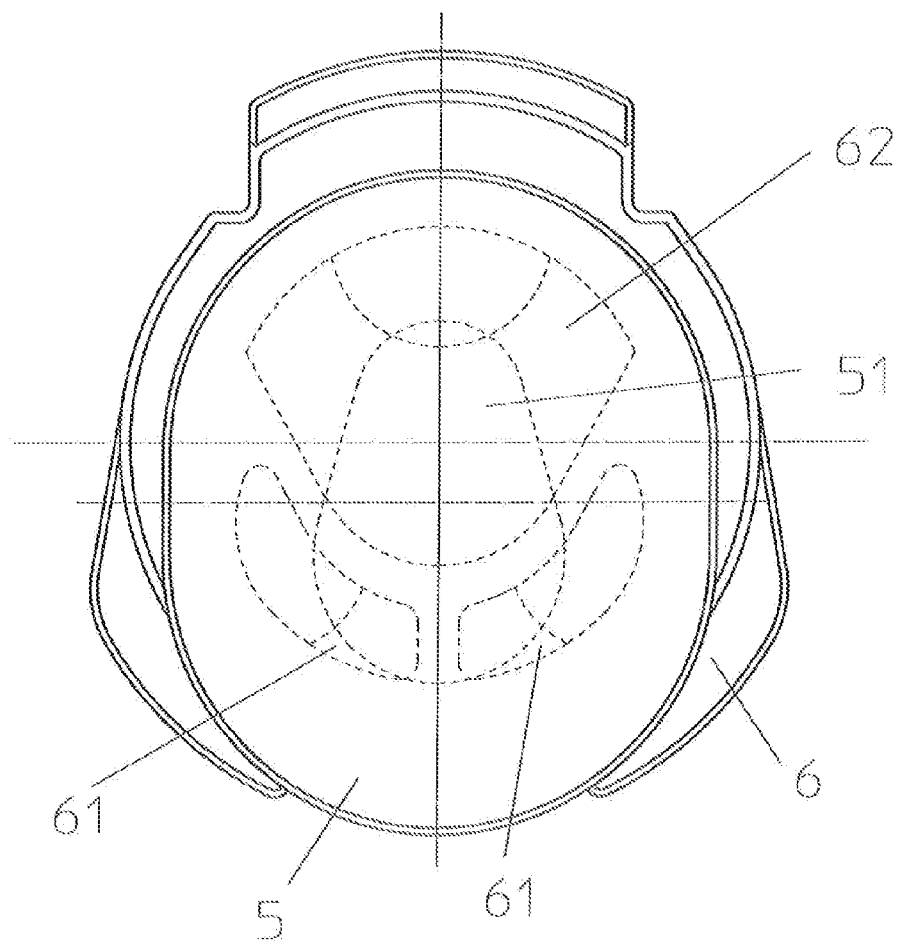
Figure 11:
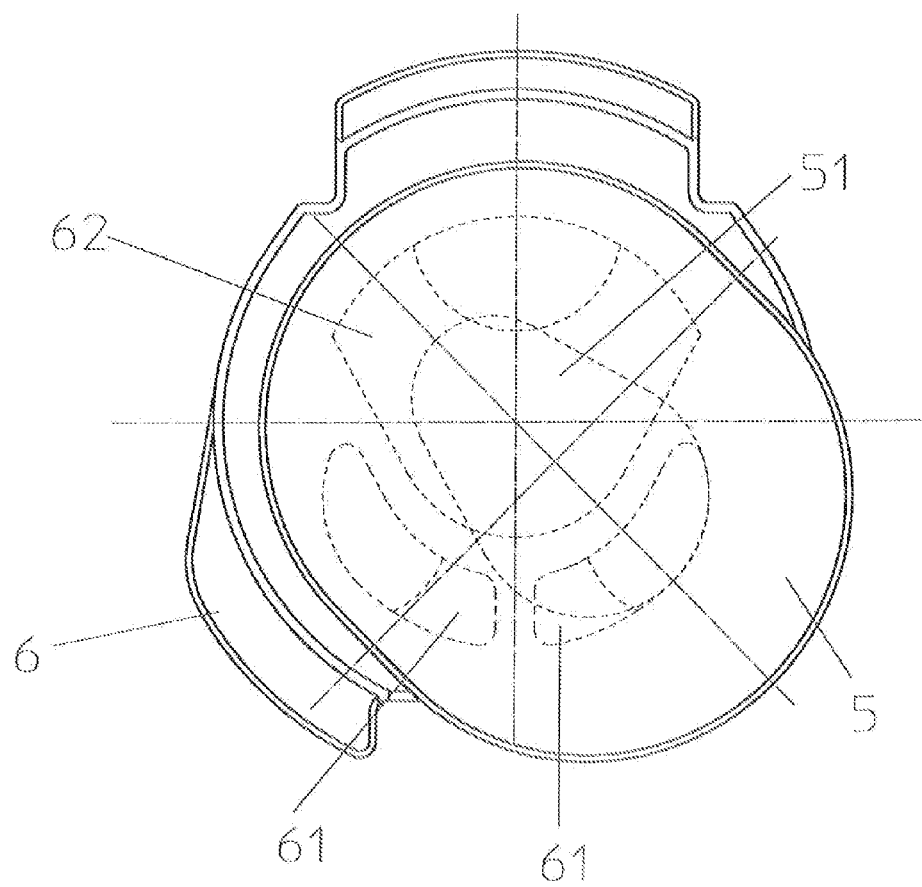
Figure 12:
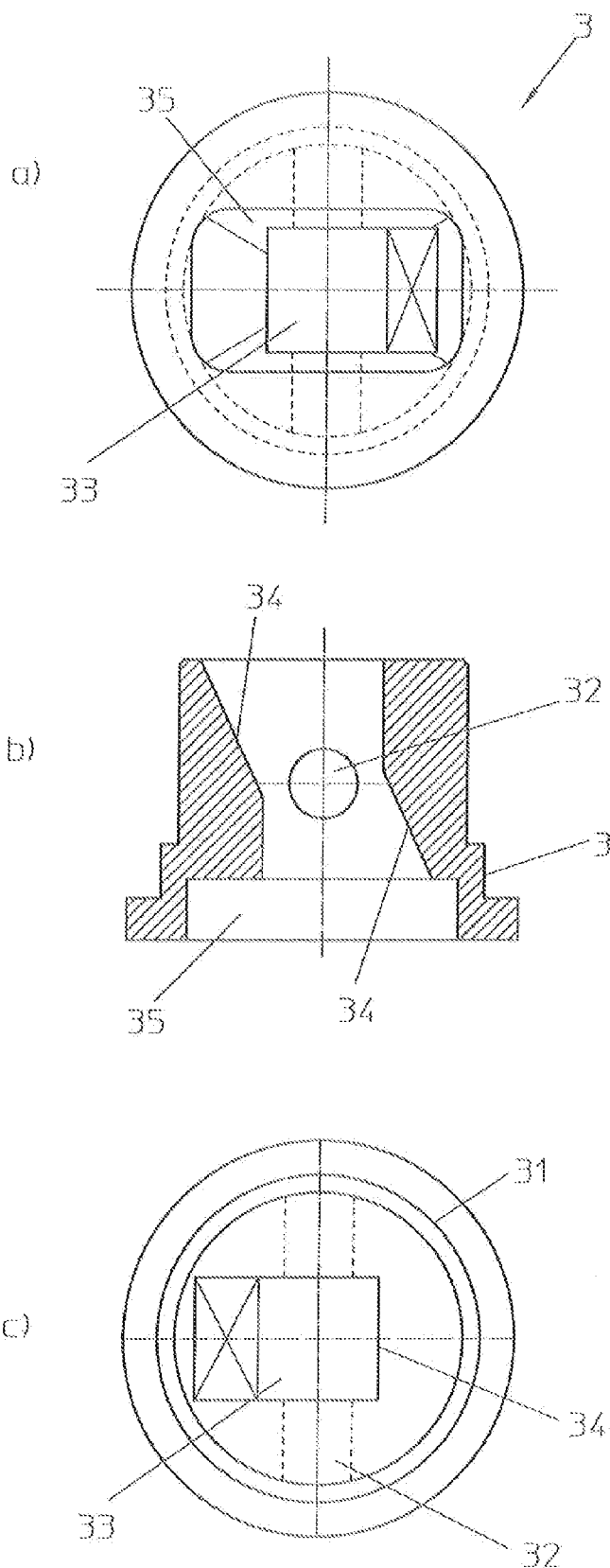
Figure 13:
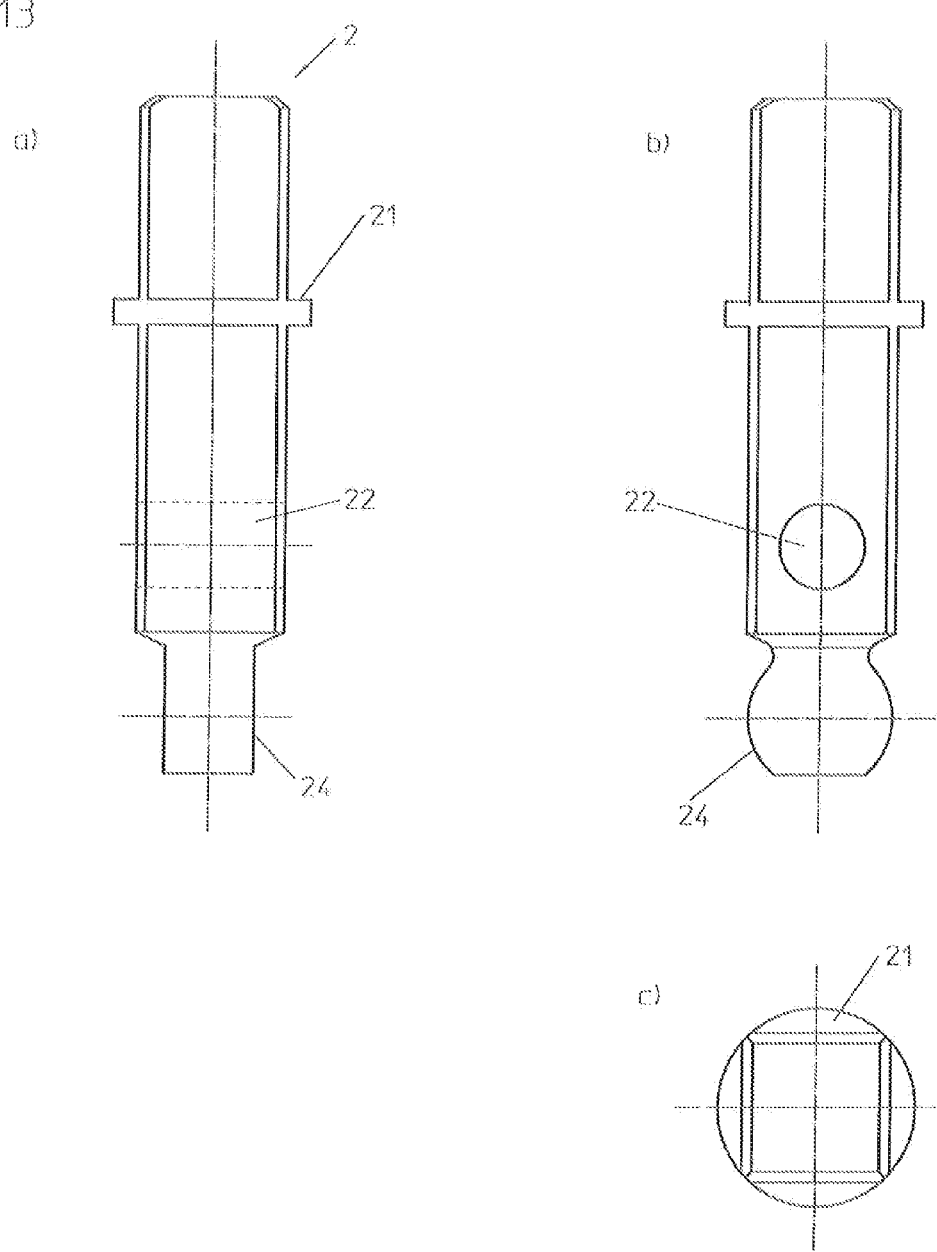
Figure 14:
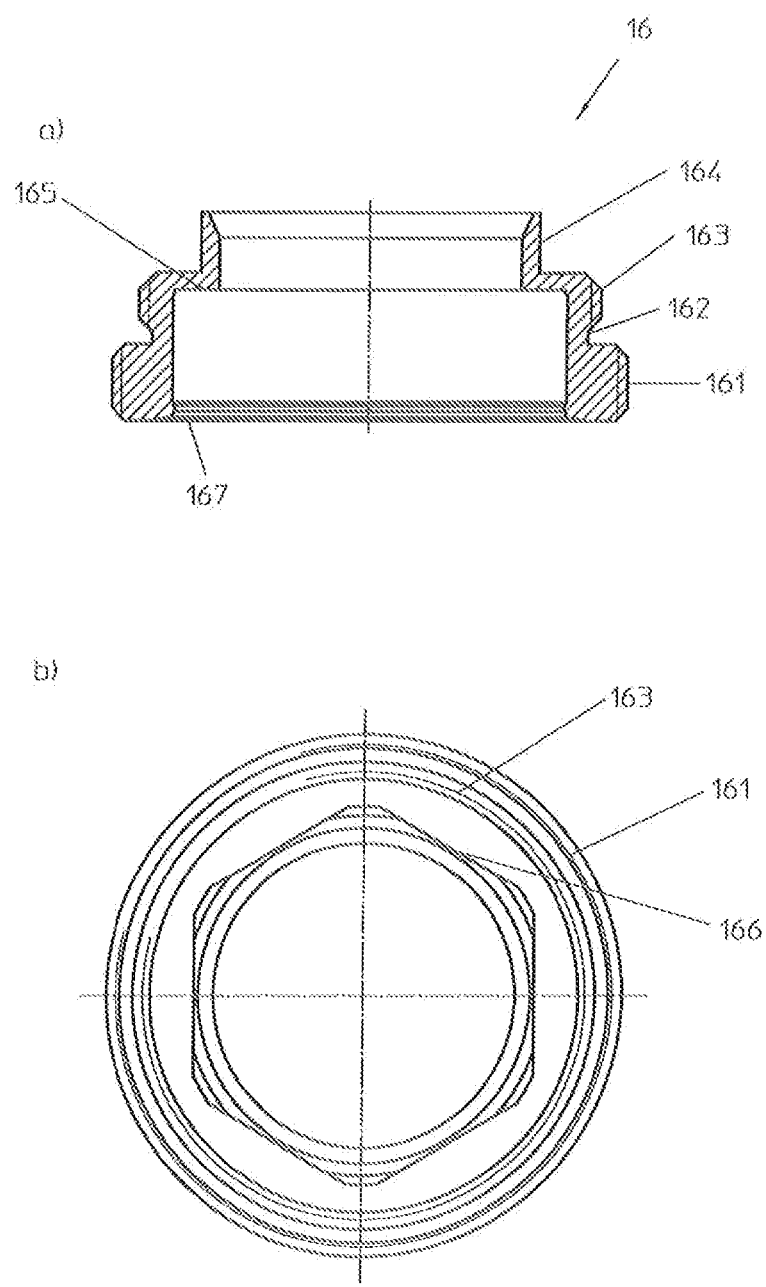

Other further developments and embodiments of the invention are indicated in the remaining dependent claims. An exemplary embodiment of the invention is shown in the drawings and will be described in detail below. The drawings show:

FIG. 1 the schematic representation of a single-lever mixer cartridge disposed in a fitting with side discharge, in longitudinal section (closed position);

FIG. 2 the single-lever mixer cartridge from FIG. 1 in the open position;

FIG. 3 the schematic representation of the head piece of the mixer cartridge from FIG. 1
a) in longitudinal section,
b) in partial section (rotated by 90°),
c) in cross-section;

FIG. 4 the representation of the bottom piece of the mixer cartridge from FIG. 1
a) in a top view,
b) in longitudinal section,
c) in a view from below,
d) in section D-D of the representation from b),
e) in a side view,
f) in a side view (rotated by 90°),
g) in section B-B of the representation from b),
h) in section C-C of the representation from b),
i) in section A-A of the representation from b);

FIG. 5 the representation of the molded lip seal part of the mixer cartridge from FIG. 1
a) in a top view,
b) in section A-A of the representation from a),
c) in section B-B of the representation from a),
d) in cross-section;

FIG. 6 the representation of the pass-through disk of the mixer cartridge from FIG. 1
a) in a view from below,
b) in cross-section,
c) in a top view;

FIG. 7 the representation of the control disk of the mixer cartridge from FIG. 1
a) in a top view,
b) in cross-section with the control disk in an upside-down position,
c) in a view from below;

FIG. 8 the representation of the slide piece of the mixer cartridge from FIG. 1
a) in a view from below,
b) in cross-section,
c) in a top view;

FIG. 9 the disk controller of the mixer cartridge from FIG. 1 with control disk and pass-through disk in the "closed" position;

FIG. 10 the disk controller from FIG. 9 in the "mixed water" position;

FIG. 11 the disk controller from FIG. 9 in the "cold water" position;

FIG. 12 the spindle accommodation of the mixer cartridge from FIG. 1
a) in a view from below,
b) in cross-section,
c) in a top view;

FIG. 13 the spindle of the mixer cartridge from FIG. 1
a) in a side view,
b) in a front view,
c) in a top view;

FIG. 14 the fastening ring of the mixer cartridge from FIG. 1
a) in a sectional view,
b) in a top view, and FIG. 15 the fitting of the arrangement from FIG. 1
a) in a view from below,
b) in a sectional view,
c) in a top view.

The single-lever mixer cartridge selected as an exemplary embodiment essentially consists of a head piece 1, into which a spindle 2 projects axially, which spindle is mounted so as to pivot in a spindle accommodation 3 that is mounted so as to rotate, and engages into a slide piece 4 that is connected with a control disk 5 that corresponds with a pass-through disk 6, which is sealed against a bottom piece 8 by way of a molded seal part 7.

The head piece 1 is configured in the manner of a sleeve and is produced as a lathed brass part in the exemplary embodiment. Two ridges 11 that lie diametrically opposite one another are formed on the head piece 1 at its end facing the bottom piece 8, on the inside of which ridges an engagement groove 111 is introduced. Above the engagement groove 111, a stop 12 for the bottom piece 8 is formed into the head piece 1, circumferentially on the inside. At its end that lies opposite the ridges 11, the head piece 1 has a circumferential, diameter-increased step 13, into which a groove 131 for accommodating an O-ring 17 is introduced, centered circumferentially. Above the step 14, a diameter-reduced section 15 is disposed, on which a projection 151 is formed, circumferentially at the end. In the diameter-reduced section 15, two recesses 152 are introduced diametrically opposite one another, by means of which recesses two radial stops 153 are formed, in each instance. The stops 153 serve to limit the rotation of the spindle accommodation 3. For embodiments in which the mixing ratio is supposed to be set in constant manner, the recesses 152 can be configured as a bore into which the axial pin 23 of the spindle 2 engages, thereby blocking rotation of the spindle accommodation 3.

Furthermore, a fastening ring 16 is set over the diameter-reduced section 15 of the head piece 1. The fastening ring 16 has a first outside thread 161 on the outside circumference, so as to be screwed into a fitting 9. Above the first outside thread 161, a diameter-reduced step 162 is disposed, which is provided with a second outside thread 163. At the end, a diameter-reduced section 164 is formed on the fastening ring 16, by means of which section a stop 165 is formed. On the outside, the diameter-reduced section 164 is provided with an outside hexagon 166. At its end opposite to the diameter-reduced section 164, a projection 167 is furthermore formed circumferentially on the inside of the fastening ring 16.

In the exemplary embodiment, the spindle 2 is configured essentially in block shape. Approximately in the center of the spindle 2, a circular, coaxial, formed-on part 21 for accommodating an operating part—not shown—is formed. Below the formed-on part 21, a bore 22 for accommodating an axial pin 23 is introduced through the spindle 2. At the end, a control head 24 configured in the manner of a spherical disk is formed onto the spindle 2, which head is configured to be flattened on its side facing the slide piece 4.

The spindle accommodation 3 is configured as an essentially cylindrical plastic injection-molded part. On its end facing the slide piece 4, a two-level step 31 is formed on the spindle accommodation 3, the contour of which step corresponds to the inside contour of the two-level step 14 of the head piece 1, against which it lies. Above the two-level step 31, a radial passage bore 32 for accommodating the axial pin 23 for the spindle 2 is introduced through the spindle accommodation 3. A passage 33 for the spindle 2 is formed axially through the spindle accommodation 3, which passage has lateral stops 34 by means of which the pivot radius of the spindle 2 about the axial pin 23 is limited. The passage 33 opens into an essentially block-shaped accommodation 35 for the slide piece 4.

The slide piece 4, which is structured as a plastic injection-molded part, is configured essentially in the form of a circular disk on which an essentially block-shaped molded piece 41 is formed. The molded piece 41 is configured in such a manner that it can be displaced within the accommodation 35 of the spindle accommodation 3, in the longitudinal direction, and is guided in the transverse direction. An oblong hole 42 for accommodating the control head 24 of the spindle 2 is introduced axially through the slide piece 4, penetrating the molded piece 41. On its undersides, which are directed opposite the molded piece 41, three axial ridges 43 for accommodating the control disk 5 are furthermore formed on the slide part 4, circumferentially on the outside.

The control disk 5 is configured in oval shape and produced as a ceramic part. On its side facing the pass-through disk 6, the control disk has an egg-shaped indentation 51 disposed centrally. On its top, opposite the indentation 51, three recesses 52 for accommodating the ridges 43 of the slide piece 4 are furthermore introduced in the control disk 5, circumferentially on the outside. The control disk 5 is connected with the slide piece 4 with shape fit, by way of the recesses 52.

The pass-through disk 6 is also structured as a ceramic part. Two inlet channels 61 for cold and hot water, respectively, as well as an outlet channel 62, configured to be enlarged relative to the former, for the mixed water are introduced through the pass-through disk 6. The inlet channels 61 as well as the outlet channel 62 are passed through the pass-through disk 6 at a slant relative to the latter. At the sides, three recesses 63 for a shape-fit connection with the bottom piece 8 are introduced on the pass-through disk 6, offset relative to one another.

The molded seal part 7 is produced from rubber in the exemplary embodiment. The molded seal part 7 is formed essentially by three rings 71 that are formed onto the two other rings 71, in each instance, so that a clover-leaf contour is formed. Sealing lips 72 are formed on the rings 71 of the molded seal part 7, on the top and on the bottom, in each instance. For shape stabilization, the rings 71 are provided with a support ring 73, in each instance, which is disposed between the sealing lips 72 of the rings 71.

The bottom piece 8 is configured essentially cylindrically. Two inlet bores 81 as well as an outlet bore 82 are introduced into the bottom piece 8, the center axes of which bores delimit an equilateral triangle. The two inlet bores 81 open into a step 83 formed in the manner of spectacles, into which step a groove 84 for accommodating two O-rings is introduced, surrounding the inlet bores 81 at the edge. A groove 831 is formed laterally in the step 83. Furthermore, two support feet 85 are formed on the bottom piece 8, at a distance from the step 83, which feet, together with the step 83, delimit a channel 851, and are provided, in each instance, with an axial positioning pin 852. The support feet 85 are disposed in such a manner that they, with the step 83, delimit the outlet bore 82. The channel 851 delimited by the support feet 85 opens into the groove 831 formed in the step 83, and allows sufficient water inflow for a lateral outlet channel of a fitting 9.

On the side, a step 86 is formed on the bottom piece 8, circumferentially, in which step two recesses 861 for accommodating the ridges 11 of the head piece 1 are introduced diametrically opposite. In the region of the recesses 861, engagement projections 862 for engagement into the engagement groove 111 of the ridges 11 of the head piece 1 are formed. These engagement projections 862 allow an engagement connection between the bottom piece 8 and the head piece 1. Above the circumferential step 86, a groove 87 for accommodating an O-ring 871 for sealing the bottom piece 8 with regard to the head piece 1 is introduced circumferentially. On its top, which lies opposite the step 83, the bottom piece 8 has a clover-leaf-like accommodation 88 for the molded seal part 7. Circumferentially around the accommodation 88, three ridges 89 for accommodating the pass-through disk 6 in torque-proof manner are formed, at a uniform distance from one another. The ridges 89 engage into the recesses 63 of the pass-through disk 6. To improve the shape fit, projections 891 are formed onto two ridges 89, which projections engage into corresponding recesses 63 of the pass-through disk 6.

Figure 15:
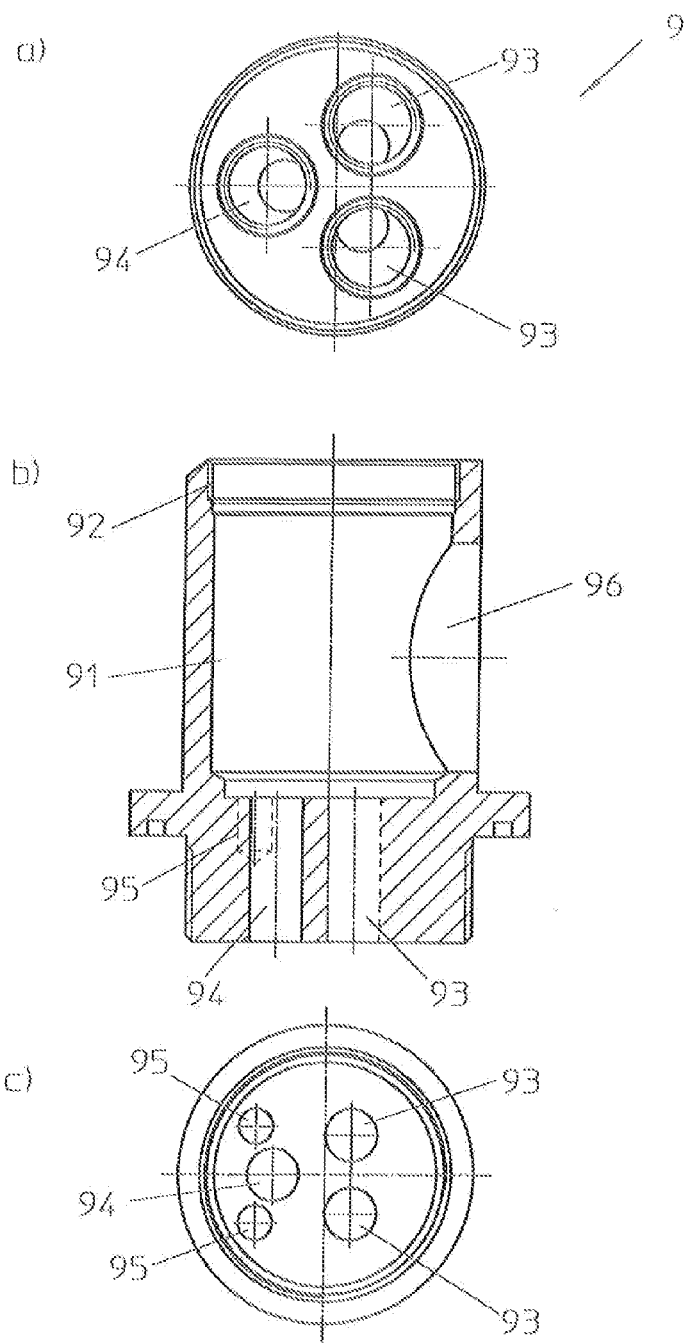

The fitting 9 is shown schematically in FIG. 15 and is configured essentially cylindrically. It has a cartridge accommodation 91, at the open end of which an inside thread 92 is introduced, for screwing in the fastening ring 16 of the head piece 1. At the bottom, two water inlet connectors 93 as well as one water outlet connector 94 open into the cartridge accommodation 91; their center axes delimit an equilateral triangle. On both sides of the water outflow connector 94, a positioning bore 95 for accommodating the positioning pins 852 of the bottom piece 8 is introduced, in each instance. To illustrate the possibilities of use of the single-lever mixer cartridge according to the invention, a lateral water outlet connector 96 is furthermore provided.

In FIGS. 9 to 11, different positions of the disk controller formed by the control disk 5 and the pass-through disk 6 are shown schematically. In the position according to FIG. 9, none of the inlet channels 61 of the pass-through disk 6 are covered by the indentation 51 of the control disk 5. The inlet channels 61 are therefore closed by the control disk 5. No water through-flow takes place (closed position).

In the position of the disk controller according to FIG. 10, both inlet channels 61 for hot and cold water are covered by the indentation 51 of the control disk 5, which simultaneously also covers the outlet channel 62 of the pass-through disk 6. Mixing of hot and cold water takes place within the indentation 51 of the control disk 5, before the mixed water exits through the outlet channel 62 of the pass-through disk 6. In the position of the disk controller according to FIG. 11, only one inlet channel 61—here the cold water feed—is covered by the indentation 51 of the control disk 5, which connects this inlet channel 61 with the outlet channel 62 of the pass-through disk 6. Therefore only cold water exits from the outlet channel 82 of the bottom piece 8.

In FIG. 2, the arrangement with the disk controller according to FIG. 10 is shown. The mixed water exits from the outlet channel 82 of the bottom piece 8 through the channel 851 in the interstice formed between the head piece 1 and the cartridge accommodation 91 of the fitting 9, and thereby gets to the water outlet connectors 94 and 96 of the fitting 9. Depending on the desired configuration of the fitting, lateral mixed water tapping through the water outlet connector 96, as well as water tapping at the bottom, are thereby made possible. The mixer cartridge itself is flushed by the water that exits from the bottom piece 8 within the cartridge accommodation 91 of the fitting 9. Entry of mixed water into the region behind the bottom piece 8 and the control unit disposed there is effectively prevented by the O-ring 17 disposed behind the engagement connection formed between engagement groove 111 of the head piece 1 and engagement projections 862 of the bottom piece 8. Possible shape changes of the bottom piece 8, which is produced from plastic, are absorbed by the O-ring 17. Shape changes of the head piece 1, particularly in the region of the bottom piece 8, are prevented by the fact that the head piece 1 is formed of brass.

Control of the water flow exiting from the outlet bore 82 of the bottom piece 8 takes place by way of the spindle 2. Pivoting of the spindle 2 about the axial pin 23 is transferred to the slide piece 4 as well as to the control disk 5 connected with the slide piece 4 with shape fit, by way of the control head 24, thereby bringing about control of the amount of water. Rotation of the spindle 2 is transferred, by way of the axial pin 23, to the spindle accommodation 3 mounted in the head piece 1 so as to rotate, which accommodation is connected with the slide piece 4, with shape fit, by way of the molded piece 41. In this way, the rotational movement is transferred to the slide piece 4 and thereby to the control disk 5 connected with the latter with shape fit, and brings about adjustment of the mixing ratio of the water streams applied to the inlet channels 61 of the pass-through disk 6.

The mixer cartridge is connected with the fitting 9 by way of the fastening ring 16, and biased against the bottom of the cartridge accommodation 91. Bias forces achieved in this way bring about equalization of production tolerances of the individual components, particularly at slide piece 4, control disk 5, pass-through disk 6, and bottom piece 8. As a result of this, a non-uniform contact pressure on the molded seal part 7 can occur between the pass-through disk 6, on the one side, and the bottom piece 8, on the other side. Because of the elastic configuration of the molded seal part 7 with the sealing lips 72 formed on this part, position adaptation of the molded seal part 7 within the accommodation 88 of the bottom piece 8 is made possible, thereby guaranteeing a reliable sealing effect. The sealing effect is supported by the sealing lips 72 that are back-flushed with water. A change in shape of the rings 71 of the molded seal part 7, which could lead to impairment of the sealing effect, is prevented by the support rings 73 introduced into the rings 71.

The fastening ring 16 is set onto the diameter-reduced section 15 of the head piece 1, whereby the circumferential projection 151 is forced elastically inward when it passes over the circumferential projection 167 of the fastening ring 16. After having passed the projection 167 of the fastening ring 16, the projection 151 of the diameter-reduced section 15 of the head piece 1 assumes its original position once again. The fastening ring 16 is thereby captively held on the head piece 1. Screwing in of the fastening ring 16 takes place by way of the outside hexagon 166. Fastening of a further housing part of the fitting 9, for example, is made possible by way of the second outside thread 163 of the fastening ring 16.

The invention claimed is:

1. Single-lever mixer cartridge comprising a head piece that accommodates a bottom piece as well as a disk controller having a control disk, which is disposed so as to be displaceable by way of a spindle mounted at least so as to pivot, wherein an outside thread is provided for being screwed into a fitting, wherein a fastening ring is provided, which has the outside thread and is set onto the head piece and captively held on the head piece, and wherein the fastening ring has a first end facing the head piece and has at the first end a circumferential engagement projection projecting radially inward from the fastening rind for captively holding the head piece.

2. Single-lever mixer cartridge according to claim 1, wherein the spindle is also mounted so as to rotate.

3. Single-lever mixer cartridge according to claim 1, wherein a holding projection directed radially outward is formed circumferentially on the head piece on its end facing the fastening ring, at least in certain sections, the outside diameter of which projection is essentially equal to the inside diameter of the fastening ring.

4. Single-lever mixer cartridge according to claim 1, wherein the spindle is held in a spindle accommodation so as to pivot, which spindle accommodation is held in the head piece so as to rotate.

5. Single-lever mixer cartridge according to claim 4, wherein at least one pin projecting radially outward is disposed on the spindle accommodation which pin is guided in a guide of the head piece.

6. Single-lever mixer cartridge according to claim 5, wherein a radial passage bore is introduced into the spindle accommodation, through which bore a pin is guided, which projects radially beyond the spindle accommodation on two opposite sides and forms the pivot axis for the spindle, the spindle having a passage bore through which the pin is guided.

7. Single-lever mixer cartridge according to claim 5, wherein the guide is formed via at least one recess into which the pin engages and the side walls of which form a stop limitation for the pin.

8. Single-lever mixer cartridge according to claim 7, wherein the recess is configured to be open toward the top, and closed via the fastening ring applied to the head piece.

9. Single-lever mixer cartridge according to claim 4, wherein the spindle accommodation has a recess for a slide piece on its side facing the control disk, into which recess the spindle projects.

10. Single-lever mixer cartridge according to claim 9, wherein an opening is introduced into the slide piece, into which opening the spindle engages on the end side, by way of which spindle the slide piece is displaceable on the spindle accommodation on its side facing the control disk.

11. Single-lever mixer cartridge according to claim 10, wherein at least one ridge that projects axially out of its surface facing away from the spindle accommodation is formed onto the slide piece, which ridge engages into a recess of the control disk.

12. Single-lever mixer cartridge according to claim 1, wherein a bottom piece is provided, in which an accommodation for torque-proof placement of a pass-through disk is introduced on its side facing the control disk.

13. Single-lever mixer cartridge according to claim 12, wherein the accommodation is formed by ridges that run circumferentially and engage into recesses disposed laterally in the pass-through disk.

14. Single-lever mixer cartridge according to claim 13, wherein the ridges comprise an arc on the outside, the diameter of which is approximately equal to the inside diameter of the head part, and wherein a projection is formed onto the ridges, which projection engages into a corresponding recess of the pass-through disk.

15. Single-lever mixer cartridge according to claim 1, wherein the head piece is produced from metal.

16. Single-lever mixer cartridge according to claim 1, wherein the head piece has a first head piece end facing the bottom piece and has a circumferential groove disposed near the first head piece end,
   wherein the bottom piece has a circumferential bottom piece projection projecting radially inwards, and
   wherein the circumferential bottom piece projection engages into the circumferential groove of the head piece to hold the head piece to the bottom piece.

* * * * *